(12) United States Patent
Murayama et al.

(10) Patent No.: US 9,674,495 B2
(45) Date of Patent: Jun. 6, 2017

(54) PROJECTION DEVICE, PROJECTION CONTROL METHOD, AND COMPUTER-READABLE MEDIUM

(71) Applicant: CASIO COMPUTER CO., LTD., Tokyo (JP)

(72) Inventors: Taiga Murayama, Ome (JP); Taichi Honjo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 329 days.

(21) Appl. No.: 14/484,865

(22) Filed: Sep. 12, 2014

(65) Prior Publication Data

US 2015/0070591 A1  Mar. 12, 2015

(30) Foreign Application Priority Data

Sep. 12, 2013  (JP) .................................. 2013-189788

(51) Int. Cl.
  *G03B 21/14* (2006.01)
  *H04N 9/31* (2006.01)
(52) U.S. Cl.
  CPC ........... *H04N 9/3185* (2013.01); *G03B 21/14* (2013.01); *G03B 21/147* (2013.01)
(58) Field of Classification Search
  CPC .. G03B 21/14; G03B 21/147; G02B 27/2292; H04N 9/3185; H04N 9/3188; H04N 9/3194
  USPC ......................................... 353/28, 30, 69, 79
  See application file for complete search history.

(56) References Cited

U.S. PATENT DOCUMENTS

| 8,985,781 B2* | 3/2015 | Sakai ................... H04N 9/3185 353/30 |
| 2015/0179147 A1* | 6/2015 | Rezaiifar ............. G03B 21/142 345/625 |
| 2015/0189248 A1* | 7/2015 | Shin ..................... H04N 9/3182 348/745 |
| 2015/0206292 A1* | 7/2015 | Masuko ............... H04N 9/3185 705/27.2 |

(Continued)

FOREIGN PATENT DOCUMENTS

| CN | 102568352 A | 7/2012 |
| JP | 2011-150221 A | 8/2011 |

OTHER PUBLICATIONS

Chinese Office Action dated Nov. 4, 2015 from related Chinese Patent Application No. 201410458255.2, together with an English language translation.

*Primary Examiner* — William C Dowling
(74) *Attorney, Agent, or Firm* — Scully, Scott, Murphy & Presser, P.C.

(57) ABSTRACT

A projection device includes: a projection part configured to project an image; a shape acquisition part configured to acquire a shape of a screen on which the image from the projection part is projected; a first projection control part configured to project a first image using a part of a projectable area by the projection part in accordance with the shape of the screen; a determination part configured to determine whether there is a projection target in an area outside the screen; and a second projection control part configured to project a second image by the projection part to the projection target in the area outside the screen in accordance with a result of the determination by the determination part.

12 Claims, 6 Drawing Sheets

(56) References Cited

U.S. PATENT DOCUMENTS

| | | | | |
|---|---|---|---|---|
| 2015/0254819 A1* | 9/2015 | Hara | ................ | G06T 5/006 |
| | | | | 345/647 |
| 2016/0037144 A1* | 2/2016 | Schultz | ................ | G03B 21/28 |
| | | | | 348/745 |
| 2016/0070160 A1* | 3/2016 | Suzuki | ................ | G03B 21/26 |
| | | | | 353/30 |

* cited by examiner

| ADVERTISING VIDEO IMAGE | TRIAL FITTING STILL IMAGE |
|---|---|
| ADVERTISING VIDEO IMAGE A | TRIAL FITTING STILL IMAGE a |
| ADVERTISING VIDEO IMAGE B | TRIAL FITTING STILL IMAGE b |
| ADVERTISING VIDEO IMAGE C | TRIAL FITTING STILL IMAGE c |
| ⋮ | ⋮ |

PROJECTION DEVICE, PROJECTION CONTROL METHOD, AND COMPUTER-READABLE MEDIUM

BACKGROUND

1. Technical Field

The present invention relates to a projection device, a projection control method, and a computer-readable medium suitable for an electronic signboard installed especially at the shop front, the merchandise rack, and the like.

2. Related Art

In the related art, a video output device mounted apparatus has been proposed which projects video content to a humanoid screen, etc. by a rear projection in order to enhance impression to a viewer (for example, JP 2011-150221 A).

SUMMARY

In a digital signage of this kind (electronic signboard) including the technology described in the above JP 2011-150221 A, many of targeted signboard portions, on which an optical image formed using a display element is projected, have an indefinite shape such as humanoid as described above in accordance with content, although the display element itself which forms an image has a rectangular display area.

Therefore, in the display element, while the image of content is displayed only in the area effective to a projection in accordance with the shape of a screen, a black image is always displayed in the surrounding area not to leak unnecessary light into outside the screen. Therefore, the display area of the display element has not been utilized effectively.

The present invention has been made in view of the above circumstance, and an object thereof is to provide a projection device, a projection control method, and a program capable of further enhancing appeal power as the electronic signboard by effectively utilizing the display area which is not originally used for the projection when the image is projected on an indefinite screen.

An aspect of the present invention is a projection device including:
- a projection unit configured to project an image;
- a shape acquisition unit configured to acquire a shape of a screen on which the image from the projection unit is projected;
- a first projection control unit configured to project a first image using a part of a projectable area by the projection unit in accordance with the shape of the screen acquired by the shape acquisition unit;
- a determination unit configured to determine whether there is a projection target in an area outside the screen; and
- a second projection control unit configured to project a second image by the projection unit to the projection target in the area outside the screen in accordance with a result of the determination by the determination unit.

According to an embodiment of the present invention, it is possible to further enhance appeal power as an electronic signboard by effectively utilizing an area which is not originally used for a projection when an image is projected on an indefinite screen.

DETAILED DESCRIPTION

An embodiment, in which the present invention is applied to a digital signage of a rear projection system, will be described in detail hereinafter with reference to the drawings.

Figure 1:
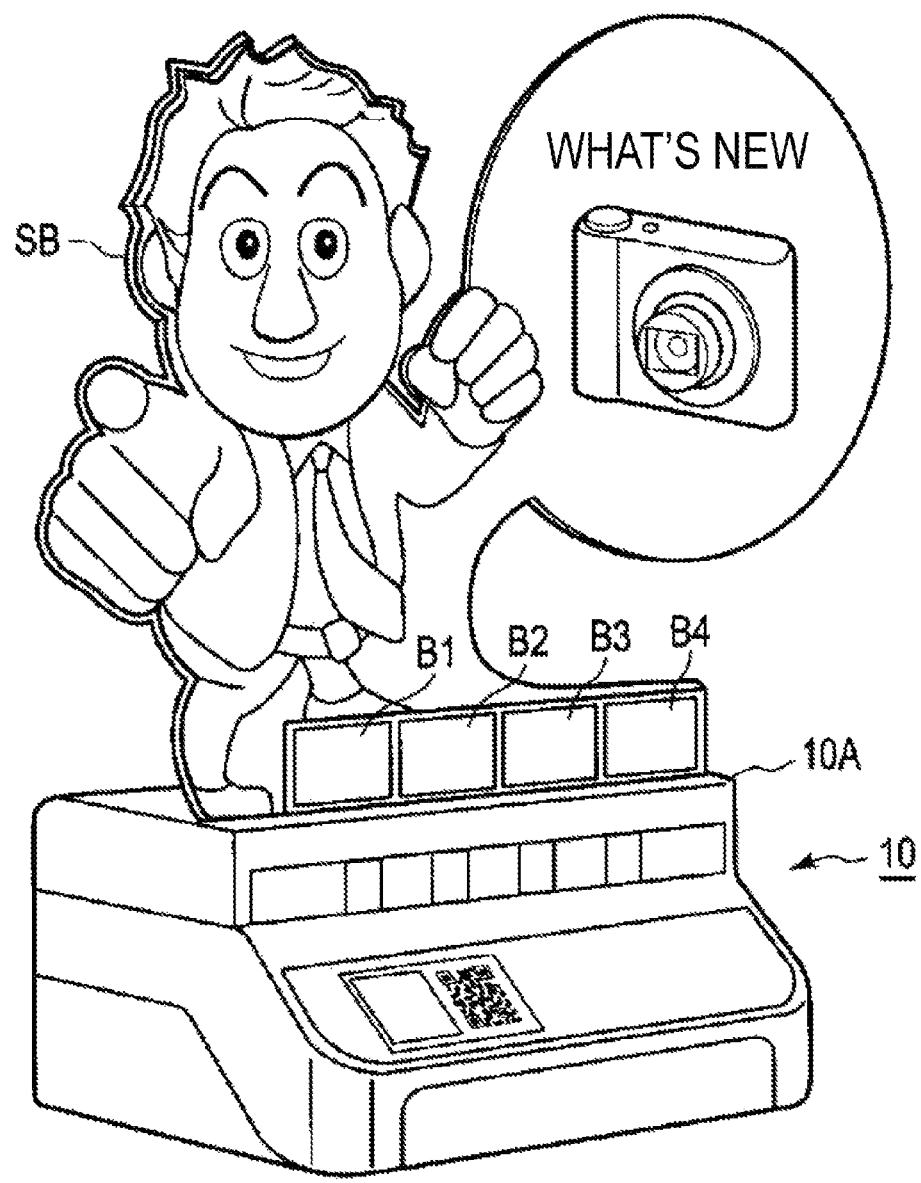
FIG. 1 is a perspective view illustrating an external configuration of a digital signage according to an embodiment of the present invention.

FIG. 1 is a perspective view illustrating an external configuration of a digital signage 10 according to the present embodiment. A replaceable signage board SB is erected at a front end side on an upper surface of a device housing 10A. This signage board SB has a translucent plate-like configuration which may have an arbitrary shape and is installed to fit into an originally rectangular projectable area of the digital signage 10.

A plurality of buttons, here four operation buttons B1 to B4, has been projected together at a lower part of this signage board SB. When a viewer performs a touch operation on any of the buttons, an operation position is detectable by a group of linear infrared ray sensors, each having directivity and arranged at a board mounting base part.

Figure 2:
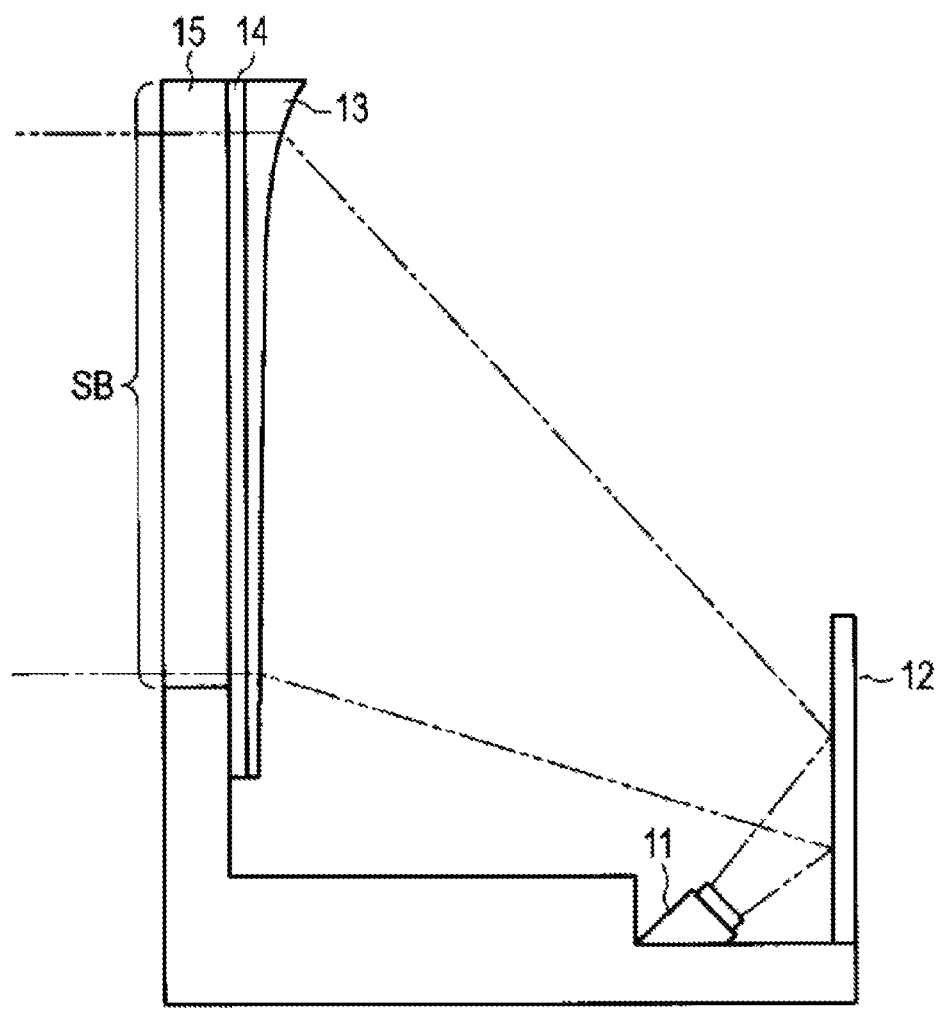
FIG. 2 is a side view illustrating a configuration of a projection optical system according to the embodiment.

FIG. 2 is a right side view of a configuration of a projection optical system provided on the upper part of the device housing 10A of the digital signage 10.

A projection luminous flux emitted obliquely upward and rearward from a projection lens barrel 11 is reflected toward a front side by a total reflection mirror 12, deflected horizontally by a Fresnel lens sheet 13, and projected to a translucent curtain-like rear projection screen 14.

A transparent board 15 is formed integrally on the front side of this rear projection screen 14. The signage board SB is configured by integrating three layers of the Fresnel lens sheet 13, the rear projection screen 14, and the transparent board 15.

While the signage board SB has an indefinite shape such as humanoid as shown in FIG. 1, a display element, for example a micro-mirror element in the projection device of digital light processing (DLP) (registered trademark) system to form an optical image emitted from the projection lens barrel 11, has a rectangular display area. Therefore, it is necessary to recognize a shape of the signage board SB correctly in order to suppress unnecessary emission of projection light into an area outside the signage board SB. The present device 10 includes a photographing optical axis almost parallel to a projection optical axis of the projection lens barrel 11 near the projection lens barrel 11, is provided with an imaging optical system capable of photographing all projection areas, and recognizes the shape of the signage board SB from an image captured by the imaging optical system.

Figure 3:
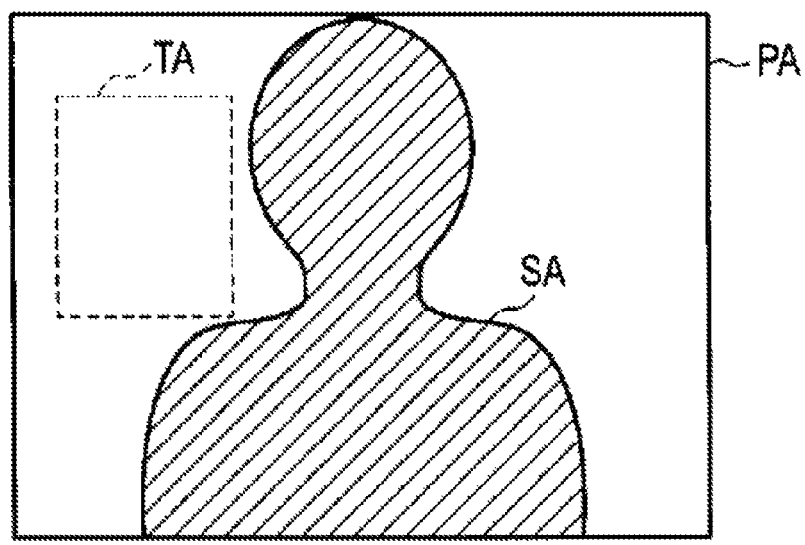
FIG. 3 is a diagram illustrating an assignment constitution of an image in a projectable area according to the embodiment.

FIG. 3 shows a state in which a CPU 32 described below recognizes the shape of the signage board SB within the projectable area PA and sets the shape as a screen projection area SA. In addition, the present embodiment sets a nearby position off the screen projection area SA in the projectable area PA, for example an upper left (to the signage board SB) small rectangular area, as a trial fitting projection area TA.

Figure 4:
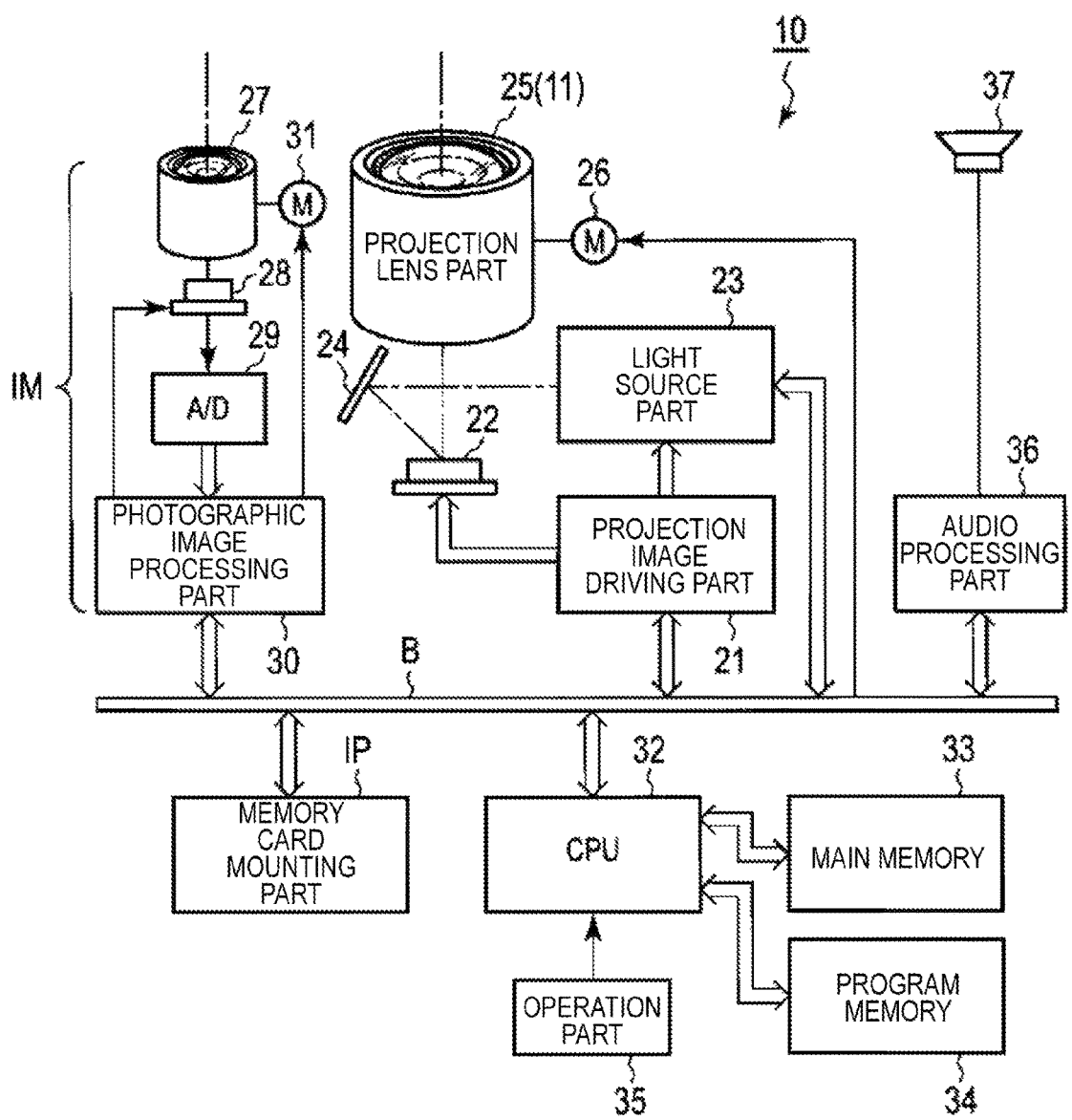
FIG. 4 is a block diagram illustrating a functional configuration of an electronic circuit according to the embodiment.

Next, mainly a functional configuration of an electronic circuit of the digital signage 10 will be described using FIG. 4. Image data is read from a memory card (not shown) mounted on a memory card mounting part IP, and sent to a projection image driving part 21 via a system bus B.

Figures 5, 6:
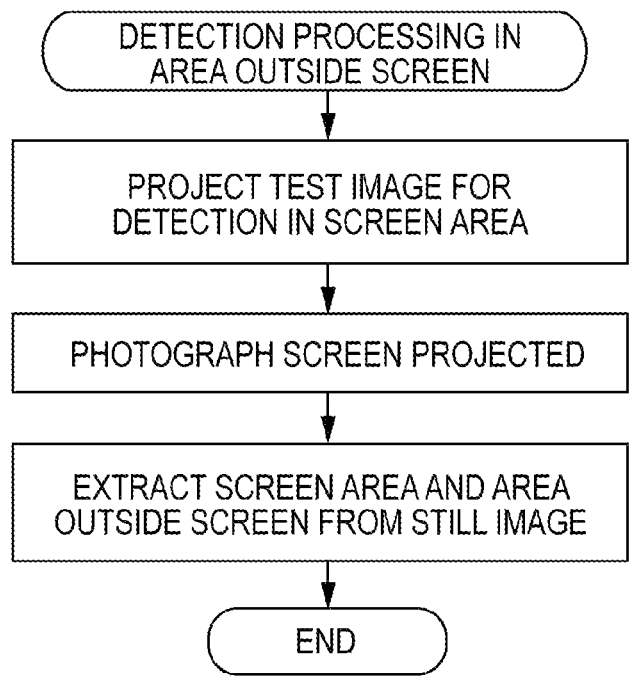
FIG. 5 is a diagram illustrating a plurality of projection images and their relations, in which the projection images are stored in a memory card mounted on a memory card mounting part IP in FIG. 4 according to the embodiment.
FIG. 6 is a flowchart illustrating contents of detection processing in the area outside the screen in a predetermined setting according to the embodiment.

FIG. 5 is a diagram illustrating a plurality of projection images and their relations, which are stored in the memory card mounted on the memory card mounting part IP. As shown in the FIG. 5, a plurality of advertising video image data is stored in the memory card, and still image data for trial fitting is stored in association with each video image data.

The projection image driving part 21 display drives a micro-mirror element 22 which is the display element, by more high-speed time-division driving, which is a product obtained by multiplying a frame rate according to a predetermined format, for example, the number of divisions for 120 (frames/second) and a color component, by the number of display gradations based on the image data sent.

This micro-mirror element 22 display operates, by an individual high-speed ON/OFF operation, each inclination angle of a plurality of micro-mirrors (corresponding to, for example, WXGA (lateral 1280 pixels×longitudinal 768 pixels)) arranged in an array shape, thereby forming the optical image by reflection light.

On the other hand, primary color light of R, G, and B is emitted cyclically in a time-division manner from a light source part 23. The light source part 23 includes an LED which is a semiconductor light emitting device, and repeatedly emits the primary color light of R, G, and B in a time-division manner. The LED included in the light source part 23 may be the LED in a broad sense which includes a laser diode (LD) or an organic EL element.

The primary color light, which is excited by emitting light from the LED to a phosphor, may have a wavelength different from that of original light. The primary color light from this light source part 23 is totally reflected by a mirror 24, and emitted into the micro-mirror element 22.

Then, the optical image is formed by the reflection light of the micro-mirror element 22, and the optical image formed is projected outside via a projection lens part 25. The projection lens barrel 11 is configured by this projection lens part 25 as a main element.

The projection lens part 25 includes, in a lens optical system inside, a focus lens which moves a focus position. A position of the lens along an optical axis direction of the lens is selectively driven via a gear mechanism (not shown) by a lens motor (M) 26.

In addition, an imaging part IM is provided in proximity to the projection lens part 25 for photographing within the projectable area PA. The imaging part IM includes a photographic lens part 27 facing the same direction as the projection lens part 25, and a CMOS image sensor 28 which is a solid state imaging device arranged in a focus position of the photographic lens part 27.

An image signal obtained by the CMOS image sensor 28 is digitized by an A/D converter 29 and sent to a photographic image processing part 30.

The photographic image processing part 30 executes a photographing operation by scan driving the CMOS image sensor 28 and performs image processing such as pattern matching to the image data obtained by photographing. As a result, the photographic image processing part 30 can perform recognition, etc., from among photographic images, of the shape of the signage board SB projected by the projection lens part 25, or the position and the size of a projection target at the trial fitting projection area TA.

In addition, the photographic image processing part 30 drives a lens motor (M) 31, for moving a focus lens position, which constitutes a part of the photographic lens part 27. The photographic image processing part 30 drives the lens motor 31 by, for example, the automatic focusing function in a contrast system and moves the focus lens of the photographic lens part 27 along the optical axis direction. Then the photographic image processing part 30 obtains a focus distance of the highest-contrast image, thereby acquiring a distance to the projection target, etc. positioned at the trial fitting projection area TA.

All the operations of each circuit described above are controlled by the CPU 32. The CPU 32 is directly connected to a main memory 33 and a program memory 34. The main memory 33 includes, for example, an SRAM and functions as a work memory for the CPU 32. The program memory 34 includes an electrically rewritable non-volatile memory, for example, a flash ROM, and stores an operation program to be executed by the CPU 32, various routine data, etc.

The CPU 32 reads the operation program or routine data stored in the program memory 34, expands it to the main memory 33, stores it in the main memory 33, and executes the program, thereby totally controlling the digital signage 10.

The CPU 32 executes various projection operations in response to an operation signal from an operation part 35. The operation part 35 receives a key operation signal of some operation keys provided in the main body of the digital signage 10, or a detection signal from a group of the infrared ray sensors which detect an operation of a button virtually projected on a part of the signage board SB. Then the operation part 35 transmits to the CPU 32 the signal corresponding to the operation received.

The CPU 32 is further connected to an audio processing part 36 via the system bus B.

The audio processing part 36 is provided with a sound source circuit of a PCM sound source, etc., converts an audio signal given at the time of projection operation into an analog signal, and drives a speaker 37 to release sound or generate beep sound if necessary.

Next, the operation of the embodiment will be described below.

The operation described below is executed as described above after the operation program, etc. read by the CPU 32 from the program memory 34 is expanded to the main memory 33. The operation program, etc. stored in the program memory 34 includes not only the one stored in the program memory 34 at the time of factory shipment of the digital signage 10, but also content such as a program for version upgrade which the user installs after purchasing the digital signage 10.

FIG. 6 is a flowchart illustrating contents of detection processing in the area outside the screen executed as a predetermined setting. The CPU 32, at its initial stage of the processing, sets the focus lens position of the projection lens part 25 according to a known value of the distance to the signage board SB preset to the digital signage 10, reads test image data for detecting a screen area from the program memory 34, displays the image data in the micro-mirror element 22, and projects the image data from the projection lens part 25 (Step P01).

In accordance with this projecting state, the CPU 32 adjusts the focus lens position of the photographic lens part 27 to the known distance to the signage board SB and photographs a projection range including the signage board SB (Step P02).

By performing pattern matching of the obtained photographic image and the projected test image, the CPU 32 extracts a rage of the screen projection area SA in the projectable area PA shown in FIG. 3, and sets the trial fitting projection area TA in accordance with an extract result (Step P03). Then the process for the predetermined setting is completed.

Next, the operation will be described in a case where the digital signage 10 is actually installed and used, for example, at the shop front after the predetermined setting.

Figure 7:
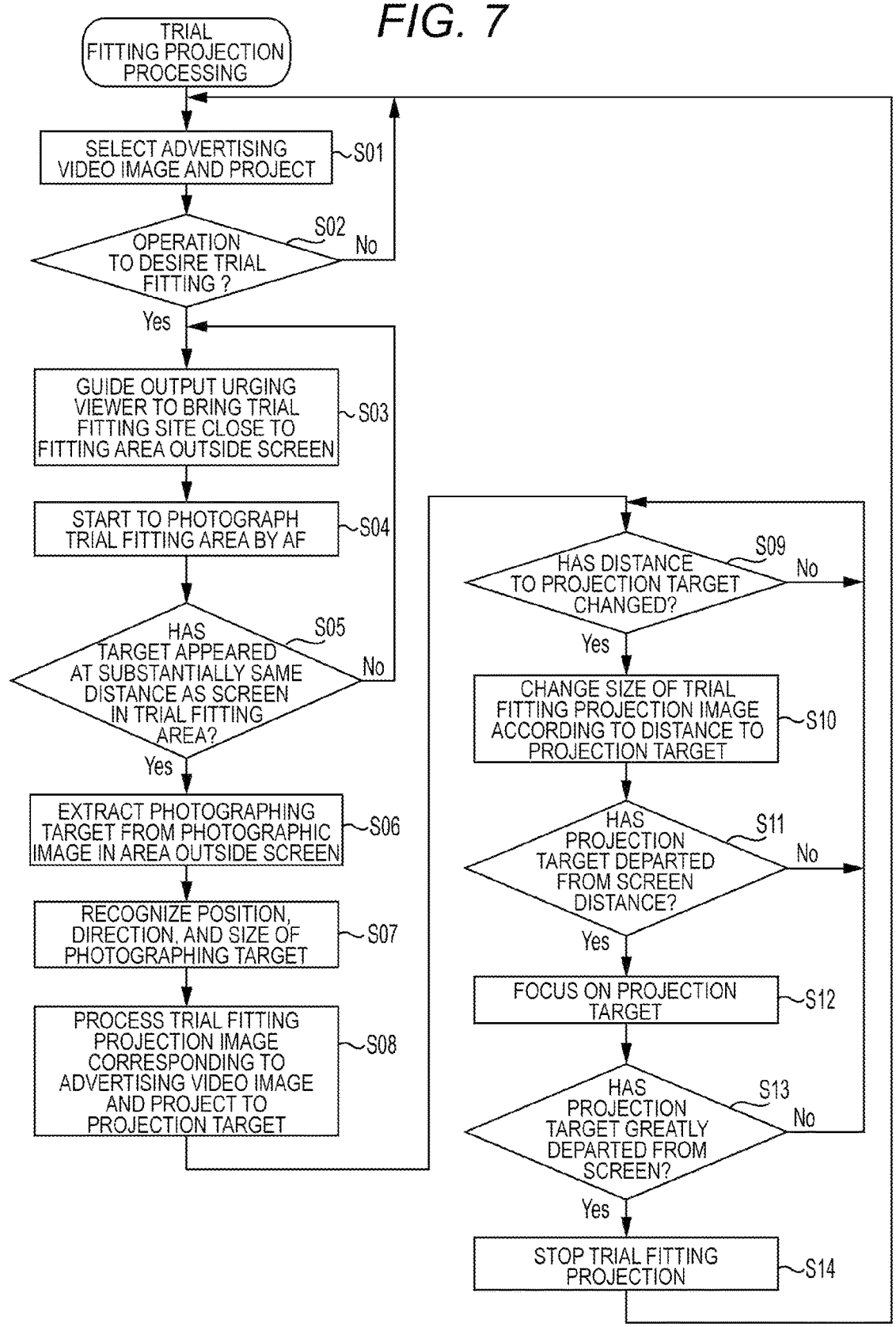
FIG. 7 is a flowchart illustrating contents of trial fitting projection processing according to the embodiment.

FIG. 7 is a flowchart illustrating processing contents of a projection operation accompanying a digital trial fitting operation executed by the CPU 32. At its initial stage of the processing, the user who has installed the digital signage 10 selects the advertising video image data stored in the memory card mounting part IP. Then the projection operation is started (Step S01).

Accompanying this projection operation, whether a trial fitting has been desired is determined by the presence or absence of the operation to one of a plurality of, for example four operation buttons (for example, an operation button B1) provided in the lower part of the signage board SB as shown in FIG. 1 (Step S02). If the trial fitting has not been desired, the flow returns to the process from Step S01.

By repeatedly executing processing of Steps S01 and S02, the trial fitting waits to be desired while the advertising video image data is being projected on the signage board SB.

When a person desiring the trial fitting appears from among the viewers of the advertising video image projected on the signage board SB, and the operation button B1 is operated, the CPU 32 determines the operation at Step S02, detects the advertising video data being projected at that time, and performs a guide output of the trial fitting still image associated as shown in FIG. 5 to the viewer so as to bring a trial fitting site, for example the wrist of the viewer when the still image data for the trial fitting is a wristwatch, close to the trial fitting projection area TA outside the signage board SB which is the screen (Step S03).

As to the guide output, an outward arrow image is superimposed and projected at the closest position to the trial fitting projection area TA in the image projected on the signage board SB, while an audio guide message such as "please hold your wrist in accordance with the position of an arrow on the projection board" is emitted from the speaker 37.

In addition to the guide output, the CPU 32 starts the photographing operation using the imaging part IM having an automatic focusing (AF) function by the photographic image processing part 30 (Step S04).

Then, the CPU 32 determines whether the projection target has appeared near the trial fitting projection area TA and at a substantially equal distance to the signage board SB based on the output of the photographic image processing part 30 (Step S05). If the projection target has not appeared, the process from Step S03 is repeated.

When it is determined in Step S05 that the projection target has appeared at substantially the same distance to the signage board SB in the trial fitting projection area TA, the CPU 32 extracts the projection target in the trial fitting projection area TA (Step S06). Then the position, direction, and size of the projection target are recognized from the extract result (Step S07).

Based on this ID result, the still image data for the trial fitting which is stored in association with the advertising video image data being projected at that time is processed. Then the still image data is projected in parallel with the video image projected on the signage board SB (Step S08).

By the projection of this trial fitting image, for example, the still image for the trial fitting of the wristwatch is projected in accordance with the position, direction, and size of the wrist while the viewer of the digital signage 10 is holding his/her wrist, which is the trial fitting site.

From this projection state, the CPU 32 tracks and detects the distance to the projection target in the trial fitting projection area TA by the automatic focusing function at the imaging part IM. The CPU 32 waits, by continuing to determine whether the distance is changed, until there is a change in the projection target (Step S09).

When it is determined in Step S09 that there is a change in the distance to the projection target, then the CPU 32 variably sets the size of the still image for the trial fitting projected in the trial fitting projection area TA (Step S10) in accordance with the distance to the projection target at that time.

In addition, the CPU 32 determines whether the projection target has separated from the signage board SB based on the distance to the projection target (Step S11).

Here, when it is determined that the projection target is still substantially at the same distance as the signage board SB, the flow returns to the process from Step S09 so as to maintain the projection state as it is.

When it is determined in Step S11 that the projection target has separated from the signage board SB, then the CPU 32 controls the lens motor 26 again, causes the projection target in the trial fitting projection area TA to be in a focusing state, not the signage board SB (Step S12). Then the CPU 32 determines, depending on whether the distance to the projection target is outside the range preset as a distance to the projection target, whether the distance to the projection target at that time has departed greatly compared with the distance to the signage board SB (Step S13).

Here, when it is determined that the distance to the projection target is within the preset range, and has not greatly departed from the signage board SB, the flow returns to the process from Step S09 while maintaining the focusing state of the projection target.

When it is determined in Step S13 that the distance to the projection target is outside the range preset and has departed greatly from the signage board SB, the CPU 32 stops at that time the projection of the still image to the projection target in the trial fitting projection area TA (Step S14). Then the flow returns to the process from Step S01 in preparation for the projection of the next trial fitting image.

As described in detail above, according to the present embodiment, it is possible to further enhance appeal power as an electronic signboard by effectively utilizing an area which is not originally used for a projection when an image is projected on an indefinite screen.

In addition, in the above embodiment, the shape of the screen or the projection target outside the screen is recognized and determined by photographing the images of the signage board SB as a screen and the projection target positioned outside the screen, thereby enhancing the flexibility as an electronic signboard without the need to limit the shape, etc. for the indefinite screen.

In addition, in the above embodiment, the position and the size of the projection target positioned at the area outside the screen are acquired from the photographic image and the projection image is projected together in accordance with the position and the size, thereby correctly realizing a virtual trial fitting state.

In addition, in the above embodiment, the imaging part IM has the automatic focusing function and acquires the distance to the projection target positioned at the area outside the screen, thereby focusing the image projected to the projection target in a projection system. Therefore, in the trial fitting state, the correct image for the trial fitting can be provided to the viewer by focusing the image for the trial fitting in preference to the image projected on the signage board SB.

In addition, in the above embodiment, especially when it is determined that the distance to the projection target outside the screen greatly differs from the distance to the signage board SB as a screen, the projection of the image for the trial fitting to the projection target is stopped. As a result, it is possible to maintain display quality as an electronic signboard to many viewers while avoiding a situation causing the projection image for the original screen to deteriorate significantly in image quality.

In addition, although the above embodiment has described a case applied to a digital signage employing the rear projection of the DLP (registered trademark) system, the present invention is not limited thereto, nor does it limit the display element which forms the optical image, the projection direction of the front/rear, difference between a video image and a still image used, usage as a device, etc.

Beyond that, the present invention is not limited to the above-described embodiment, and can be modified in various ways at its practical phase without departing from the scope thereof. In addition, the functions executed in the above-described embodiment can be carried out by suitably combining as many functions as possible. The above-described embodiment includes various stages, and various inventions may be extracted by suitable combinations of plural components disclosed. For example, as long as the effect can be obtained even if some of the components are deleted from all of the components shown in the embodiment, the configuration from which the components have been deleted can be extracted as an invention.

What is claimed is:

1. A projection device comprising:
    a projection part configured to project an image;
    a shape acquisition part configured to acquire a shape of a screen on which the image from the projection part is projected;
    a first projection control part configured to project a first image using a part of a projectable area by the projection part in accordance with the shape of the screen;
    a determination part configured to determine whether there is a projection target in an area outside the screen; and
    a second projection control part configured to project a second image by the projection part to the projection target in the area outside the screen in accordance with a result of the determination by the determination part.

2. The projection device according to claim 1, further comprising a photographing part configured to photograph the screen and a direction of the projectable area by the projection part,
    wherein the shape acquisition part acquires the shape of the screen from a photographic image obtained by the photographing part, and
    the determination part determines from the photographic image obtained by the photographing part whether there is the projection target in the area outside the screen.

3. The projection device according to claim 2, further comprising a projection target acquisition part configured to acquire a position and size of the projection target from the photographic image when it is determined by the determination part, from the photographic image obtained by the photographing part, that there is the projection target in the area outside the screen,
    wherein the second projection control part projects the second image in accordance with the position and size of the projection target acquired by the projection target acquisition part.

4. The projection device according to the claim 3,
    wherein the photographing part has an automatic focusing function,
    the projection target acquisition part also acquires a distance to the projection target by analysis of a plurality of photographic images acquired through the automatic focusing function of the photographing part, and
    the second projection control part projects the second image in accordance with the distance to the projection target acquired by the projection target acquisition part.

5. The projection device according to claim 4,
    wherein the second projection control part stops a projection of the second image when the distance to the projection target acquired by the projection target acquisition part is out of a preset range.

6. The projection device according to claim 1, further comprising a storage part configured to:
    store the first image projected by the first projection control part and the second image projected by the second projection control part; and
    associate the first image projected by the first projection control part and the second image projected by the second projection control part,
    wherein the second projection control part projects the second image based on the storage part.

7. The projection device according to claim 2, further comprising a storage part configured to:
    store the first image projected by the first projection control part and the second image projected by the second projection control part; and
    associate the first image projected by the first projection control part and the second image projected by the second projection control part,
    wherein the second projection control part projects the second image based on the storage part.

8. The projection device according to claim 3, further comprising a storage part configured to:
    store the first image projected by the first projection control part and the second image projected by the second projection control part; and
    associate the first image projected by the first projection control part and the second image projected by the second projection control part,
    wherein the second projection control part projects the second image based on the storage part.

9. The projection device according to claim 4, further comprising a storage part configured to:
    store the first image projected by the first projection control part and the second image projected by the second projection control part; and associate the first image projected by the first projection control part and the second image projected by the second projection control part, wherein the second projection control part projects the second image based on the storage part.

10. The projection device according to claim 5, further comprising a storage part configured to:

store the first image projected by the first projection control part and the second image projected by the second projection control part; and associate the first image projected by the first projection control part and the second image projected by the second projection control part, wherein the second projection control part projects the second image based on the storage part.

11. A projection control method to be used in a device which includes a projection part configured to project an image, the projection control method comprising:

a shape acquisition step of acquiring a shape of a screen on which the image from the projection part is projected;

a first projection control step of projecting a first image using a part of a projectable area by the projection part in accordance with the shape of the screen;

a determination step of determining whether there is a projection target in an area outside the screen; and a second projection control step of projecting a second image by the projection part to the projection target in the area outside the screen in accordance with a result of the determination by the determination step.

12. A non-transitory computer-readable storage medium storing a program to be executed by a computer included in a device which includes a projection part configured to project an image, the program causing the computer to function as:

a shape acquisition unit configured to acquire a shape of a screen on which the image from the projection part is projected;

a first projection control unit configured to project a first image using a part of a projectable area by the projection part in accordance with the shape of the screen;

a determination unit configured to determine whether there is a projection target in an area outside the screen; and a second projection control unit configured to project a second image by the projection part to the projection target in the area outside the screen in accordance with a result of the determination by the determination unit.

* * * * *